(12) United States Patent (10) Patent No.: US 6,675,207 B1
Mamada (45) Date of Patent: Jan. 6, 2004

(54) POSSIBILITY OF EXECUTION EVALUATING APPARATUS AND METHOD THEREFOR

(75) Inventor: Rysuke Mamada, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/503,928

(22) Filed: Feb. 14, 2000

(30) Foreign Application Priority Data

Feb. 15, 1999 (JP) .......................................... 11-035575

(51) Int. Cl.⁷ ............................................. G06F 15/173
(52) U.S. Cl. .......................... 709/223; 717/120; 706/48; 709/223; 709/239
(58) Field of Search ........................... 705/7–8; 709/22, 709/203, 223, 239; 717/5, 9, 117, 124–161; 706/46–48

(56) References Cited

U.S. PATENT DOCUMENTS

| | | | | | |
|---|---|---|---|---|---|
| 5,255,181 | A | * | 10/1993 | Chapman ........................ | 705/8 |
| 5,321,605 | A | * | 6/1994 | Chapman et al. ............... | 705/7 |
| 5,826,236 | A | * | 10/1998 | Narimatsu et al. .............. | 705/8 |
| 6,108,687 | A | * | 8/2000 | Craig ........................... | 709/203 |
| 6,178,431 | B1 | * | 1/2001 | Douglas ....................... | 707/513 |
| 6,230,172 | B1 | * | 5/2001 | Purnaveja et al. ........ | 707/501.1 |
| 6,301,590 | B1 | * | 10/2001 | Siow et al. ................... | 707/500 |

FOREIGN PATENT DOCUMENTS

| | | |
|---|---|---|
| JP | 06028165 | 2/1994 |
| JP | 08083195 | 3/1996 |
| JP | 09016389 | 1/1997 |
| JP | 09114693 | 5/1997 |
| JP | 09237191 | 9/1997 |

OTHER PUBLICATIONS

"A Macro–Task Generation Scheme for Fortran MarcoDataflow Computation", H. Kasahara, et al., Faculty of Engineering, Yamanashi University, vol. 175–D–I, No. 8, pp. 511–525 (1992).

"A Global Code Scheduling Technique Using Guarded PDG", Akira Koseki, et al., School of Science & Engineering, Waseda University, (1993).

"PQL: Modal Logic for Compositional Verification of Concurrent Programs", Naoshi Uchihira, Systems & Software Engineering Laboratory, Toshiba Corporation, vol. 175D–I, No. 2, pp. 76–87 (1992).

"Coarse Grain Parallelism Detection Scheme of a Fortran Program", Hiroki Honda, et al., NTT Communications and Information Processing Laboratories, vol. J73–D–I, No. 12, pp. 951–960 (1990).

"A Multi–Grain Parallel Processing of Fortran Programs", Masami Okamoto, et al., Waseda University and Yamashi University.

\* cited by examiner

Primary Examiner—Tuan Q. Dam
Assistant Examiner—Chuck Kendall
(74) Attorney, Agent, or Firm—Scully, Scott, Murphy & Presser; Richard M. Ludwin, Esq.

(57) ABSTRACT

A compiler 2 sequentially simplifies, according to predetermined rules, a network of a processing flow defined by a PERT diagram and including a plurality of jobs executable in parallel, and determines which of any other jobs provide processing results causing each job to start and perform the processing when accepting them. Further, in the process of the simplification, if a pattern making the processing flow inexecutable, such as a loop, occurs in the network, the compiler 2 determines that the processing flow is inexecutable, and shows it to the user. If the processing flow is inexecutable, the compiler 2 generates a program for actualizing the processing of each job in the processing flow in synchronism with the processing of other jobs.

10 Claims, 9 Drawing Sheets

[Figure 1]
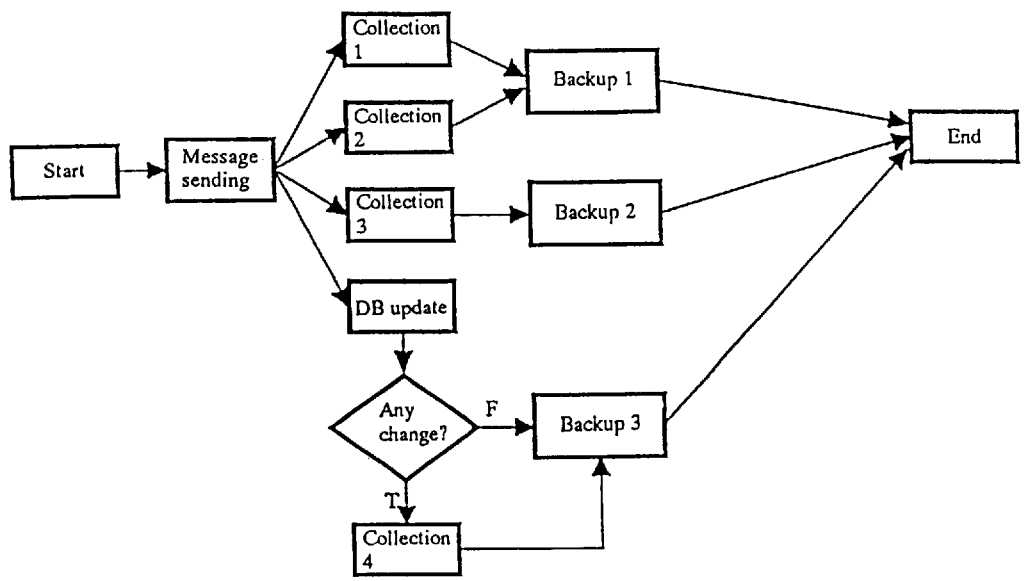
[Figure 2]
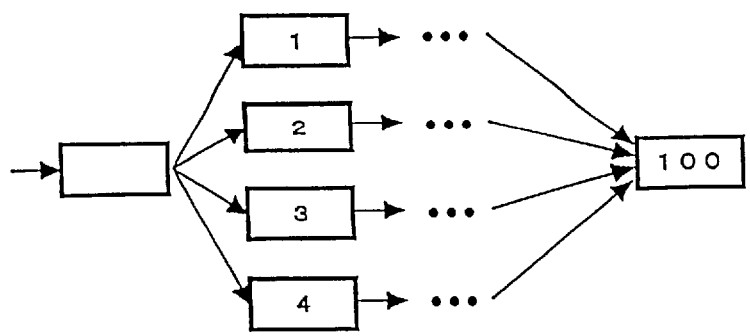
Parallel execution/queuing

[Figure 3]
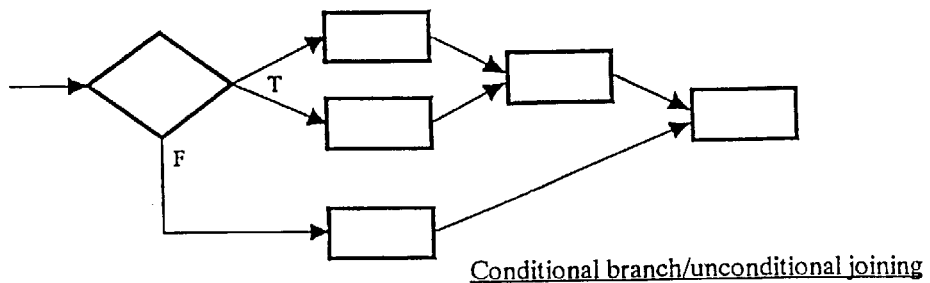
Conditional branch/unconditional joining
[Figure 4]
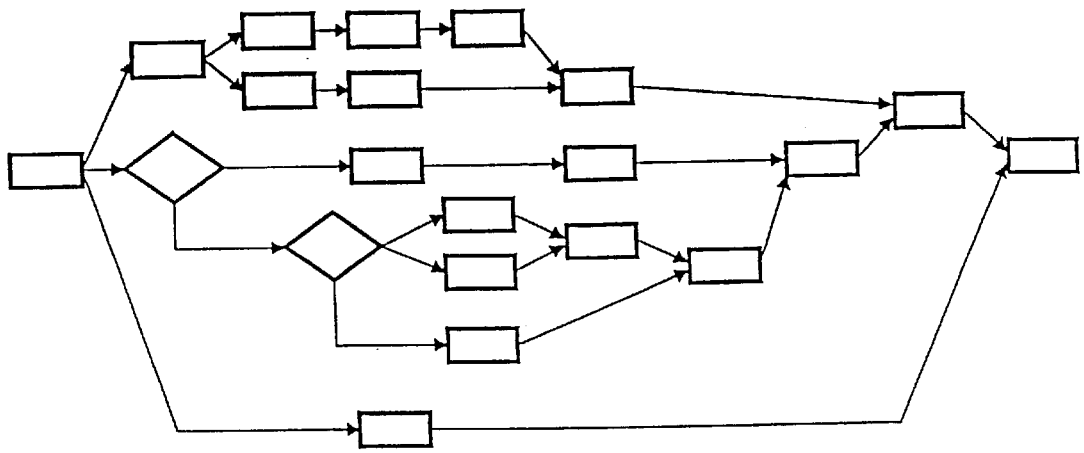
[Figure 5]
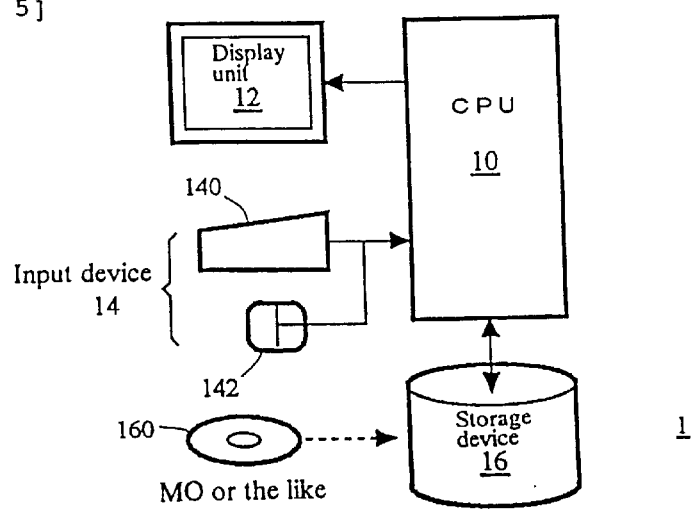

[Figure 6]
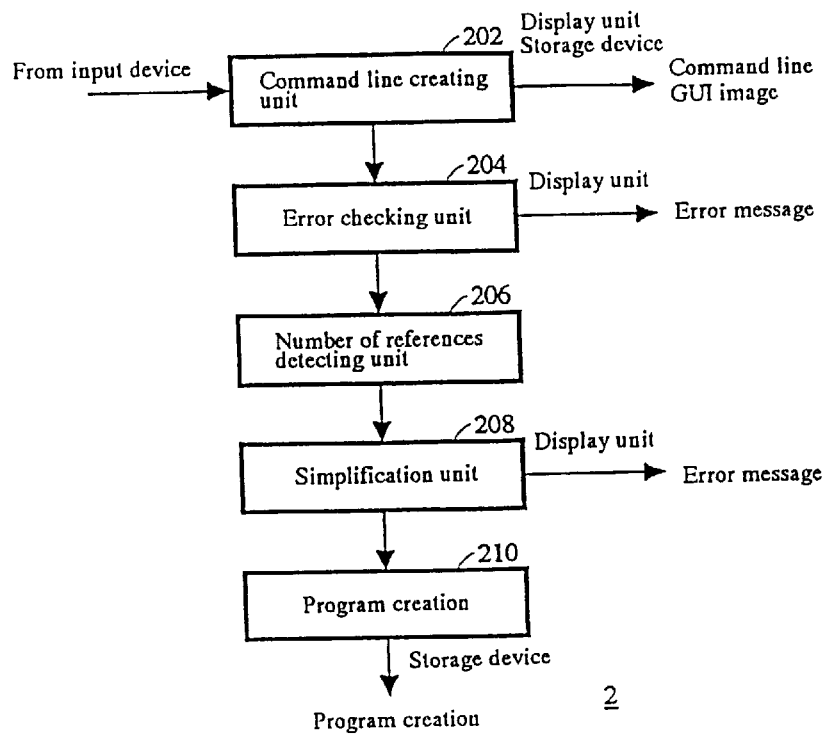
[Figure 7]
| ID | Name | Job | Next IDs | On False Ids | Detailed definition of execution program name and the like |
|---|---|---|---|---|---|
| 0 | Start | | 1 | | - |
| 1 | Send 1 | Message sending | 235 | | - |
| 2 | Collection 1 | Collection of DB1 | 4 | | - |
| 3 | Collection 2 | Collection of DB2 | 4 | | - |
| 4 | Backup 1 | | 9 | | - |
| 5 | DB update | Collection of DB3 | 6 | | - |
| 6 | Condition 1 | Any change in DB3? | 7 | 8 | - |
| 7 | Collection 3 | | 8 | | - |
| 8 | Backup 2 | | 9 | | - |
| 9 | End | | | | - |

[Figure 8]
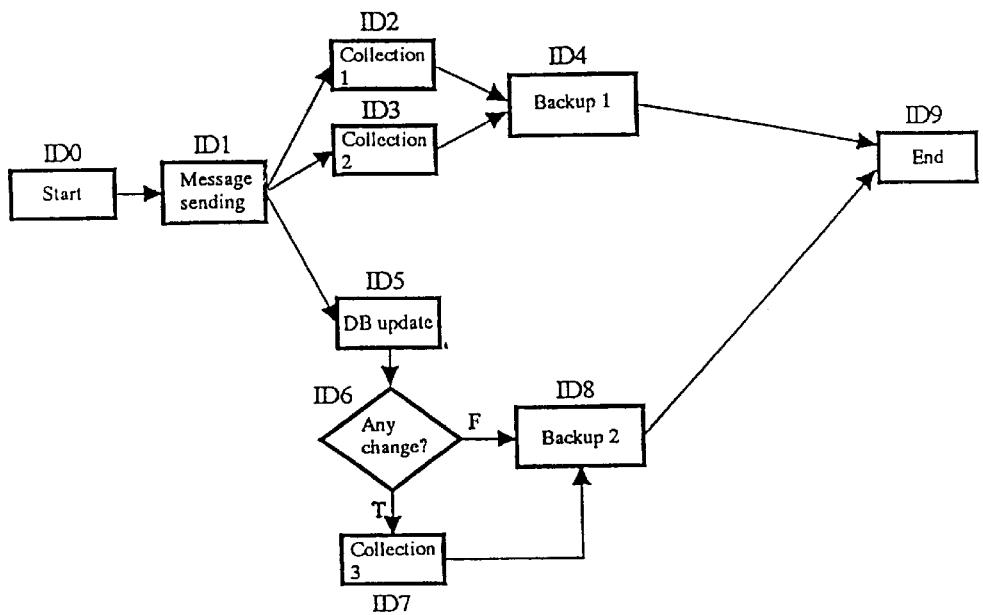
[Figure 9]
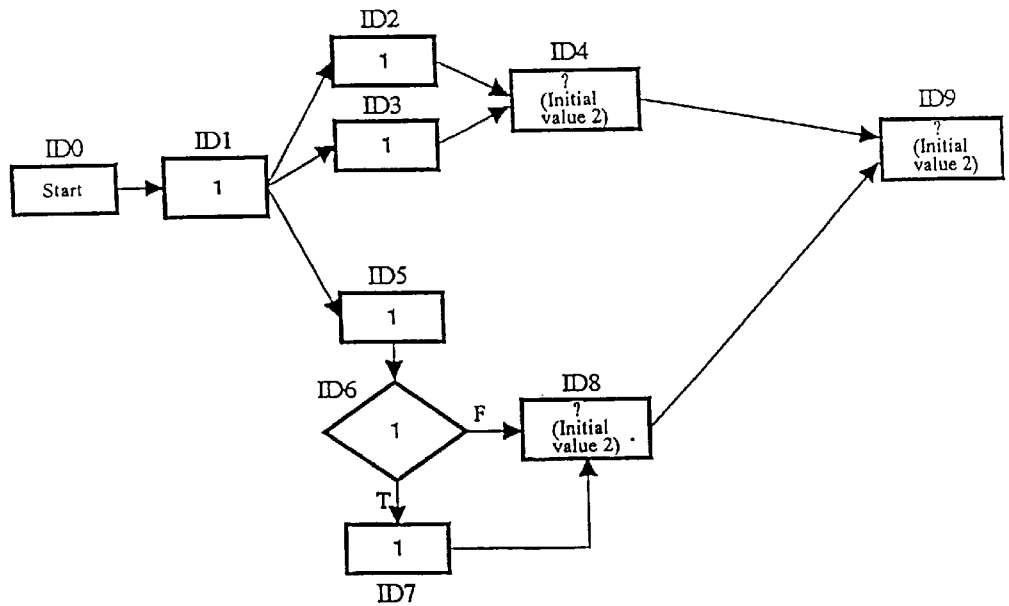

[Figure 10]
(A) Simplification rule 1
(B) Simplification rule 2
(C) Simplification rule 3
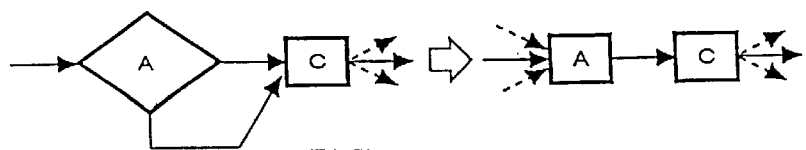
(D) Simplification rule 4
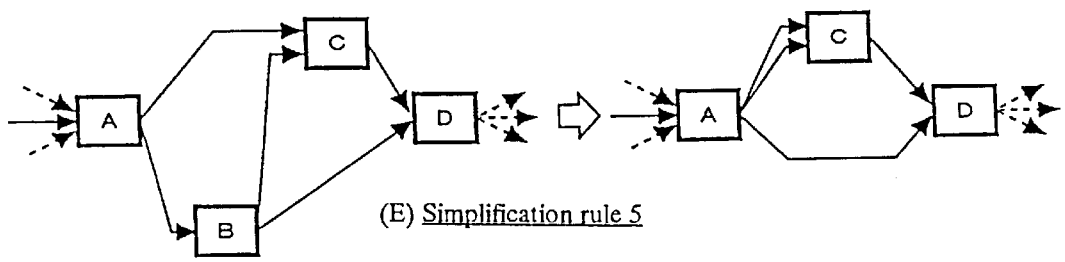
(E) Simplification rule 5

[Figure 11]
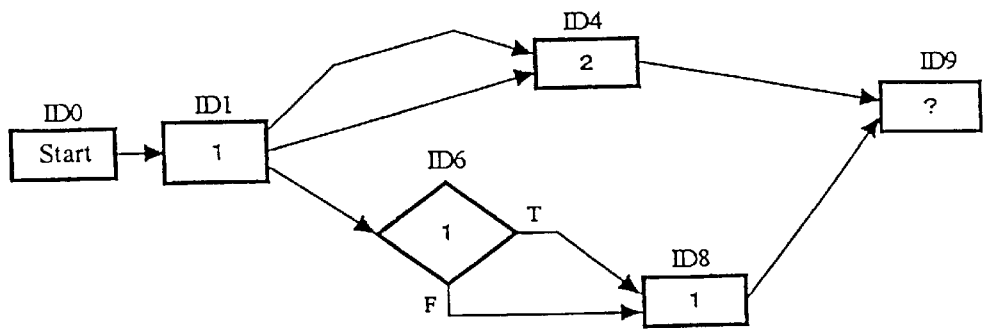
[Figure 12]
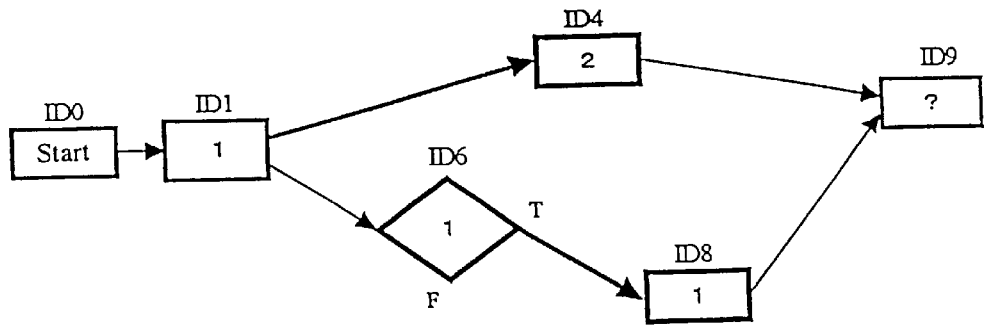
[Figure 13]
[Figure 14]
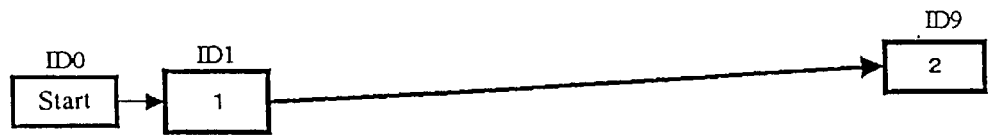

[Figure 15]
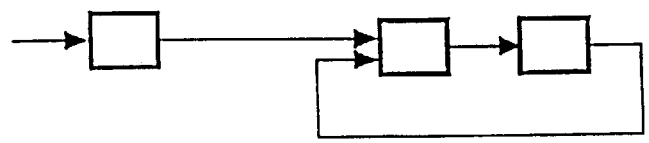
(A) Loop 1
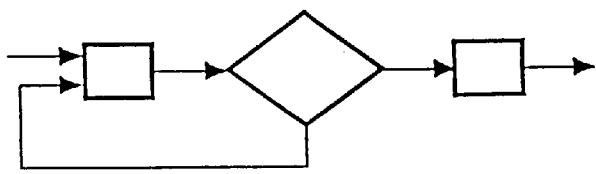
(B) Loop 2
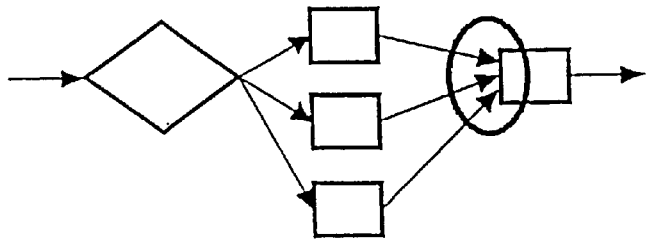
(C) Queuing 1 before joining
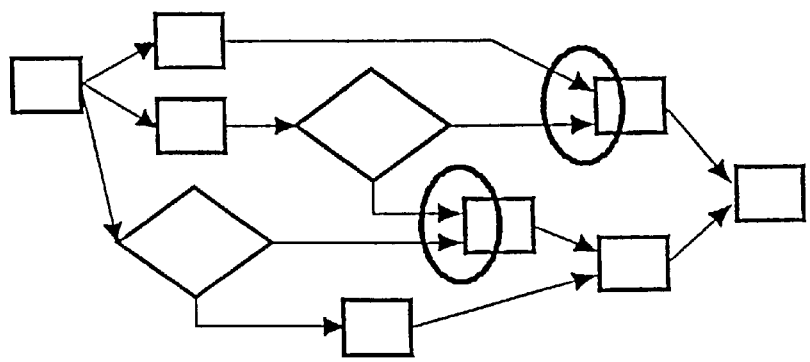
(D) Queuing 2 before joining

[Figure 16]
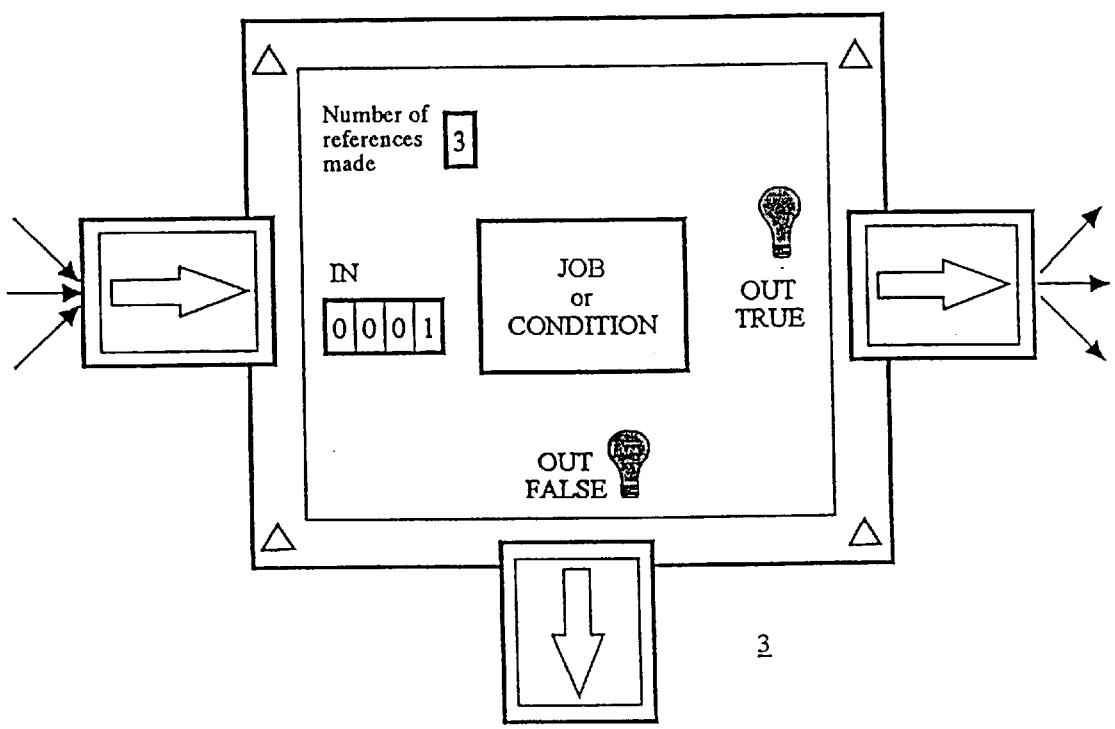

[Figure 17]
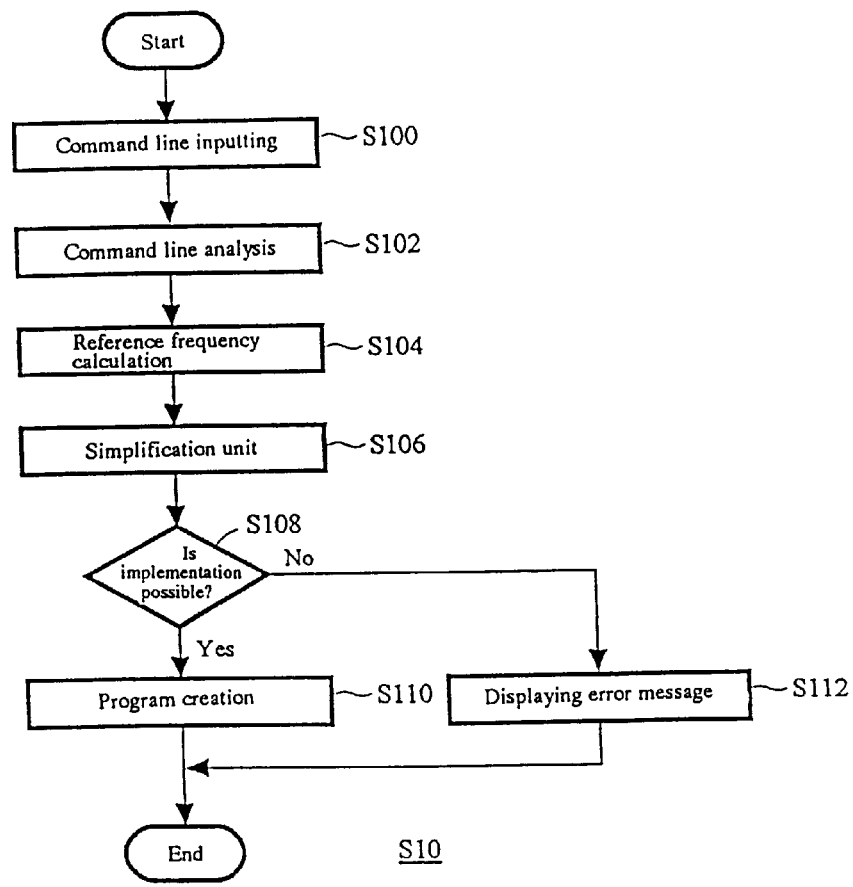

POSSIBILITY OF EXECUTION EVALUATING APPARATUS AND METHOD THEREFOR

BACKGROUND OF THE INVENTION

1. Technical Field

The present invention relates to a compiler apparatus and method for evaluating the possibility of execution of a plurality of processings executable in parallel in a distributed computer system, and creating a program for implementing such processings.

Specifically, the present invention relates to a compiler apparatus and method for evaluating the possibility of execution of a plurality of processings which are described by a PERT (Program Evaluation and Review Technique) method and can be executed in parallel, and creating a program for implementing such processings.

2. Prior Art

For instance, "Introduction to PERT" (Reference 1: written by Tokutaro Suzuki, and published by Japan Management Association, May 28, 1980) and "Process Control (New version)" (Reference 2: written and edited by Administrative Section of Industrial Structure Council by Ministry of International Trade and Industry, written by All Japan Management Federation, and published by the Nikkan Kogyo Shinbun Ltd., Aug. 30, 1972) disclose a method for using a PERT diagram for project management.

Further, many references such as Published Unexamined Patent Application Nos. 5-216643, 8-6816, 7-295855, and 6-161773 (References 3–6) disclose a method for creating programs executed in parallel.

Furthermore, NEC Corporation is selling "ESMPRO/JMSS" as a product of this type.

In this ESMPRO/JMSS, a processing flow can be defined by a GUI operation using a PERT diagram.

Since the parallel execution of a plurality of jobs, a queuing of executions and the like can be explicitly defined, the PERT diagram is suitable for defining a processing including a plurality of jobs executed in parallel, which is difficult to be defined by a procedure-oriented programming language such as C, if a new concept such as conditional branch is introduced and the synchronization method between processing nodes is previously determined.

However, the flowchart which has been conventionally used to define a processing flow and the PERT diagram are different in the point that, in the latter, the concepts of "parallel execution" and "queuing" are defined, while in the former, these concepts are not defined, so it is difficult to describe a processing flow defined by the PERT diagram with a procedure-oriented programming language suitable for describing a processing flow defined by a flowchart.

Further, if the use of conditional branch, which has originally been inhibited, is permitted in the PERT diagram for defining a wider processing flow, it is more difficult to express the definition of a job defined by the PERT diagram with a procedure-oriented programming language.

This difficulty becomes more remarkable as the processing size becomes greater, and as the processing flow becomes more complex.

The present invention was performed in view of the above-mentioned problems of the background art, and its object is to provide a possibility of execution evaluating apparatus and method which can evaluate the possibility of execution of a processing defined by a PERT diagram or a similar technique, and can assist the creation of a program for implementing the defined processing.

Moreover, it is an object of the present invention to provide a possibility of execution evaluating apparatus and method for evaluating whether or not a processing including a plurality of jobs executable in parallel and defined by a PERT diagram or a similar form can be described with a procedure-oriented programming language, and if the description is possible, pointing out the reason for it to assist the creation of a program for implementing the above-identified processing.

SUMMARY OF THE INVENTION

To attain the above objects, the possibility of execution evaluating apparatus related to the present invention is a possibility of execution evaluating apparatus for evaluating the possibility of execution of a processing flow including one or more jobs being executable in parallel, each of the jobs starting when accepting the processing result of a one or more previous jobs, comprising:

a simplification unit for simplifying a PERT network including one or more jobs included in the processing flow as is nodes, respectively, according to predetermined rules (simplification rules); and a possibility of execution evaluating unit for evaluating the processing flow as being inexecutable when predetermined connection patterns are happening between the nodes in the part being not able to be simplified any more in the simplified network.

Preferably, it has a starting job determining unit for sequentially determining which of the previous jobs (starting job) provides a processing result that causes the jobs corresponding to the nodes forming the part being not simplified any more to start when accepting the processing result in the simplified network.

Preferably, the simplification rules include rules for transforming the PERT network to topologically equal simple form.

Preferably, the processing flow may include conditional branches as the jobs, and the simplification rules include: a first rule in which there are one or more starting jobs, and if there are a first job which outputs processing results to one or more next jobs, a second job which starts when accepting only the processing result of the first job and outputs a processing result only to one next job, and a third job which starts only upon the processing result of the second job and outputs a processing result to one or more next jobs, then in the PERT network, the node corresponding to the second job is removed, and the node corresponding to the first job and the node corresponding to the third job are directly connected to each other; a second simplification rule in which there are one or more starting jobs, and if there are a fourth job which outputs a processing result of the fourth job and does not output a processing result to the next job, then in the network, the node corresponding to the fifth job is removed; a third simplification rule in which, if there are the first job (a sixth job), and the third job (a seventh job) which starts when accepting a plurality of processing results of the sixth job, the plurality of processing results which are outputted from the sixth job to the seventh job are collected to one in the network; a fourth simplification rule in which, if there is a eighth job showing a conditional branch, and the third job (a ninth job) which starts when accepting the results of the conditional branch of the eighth job, then in the network, the node corresponding to the eighth job is converted to a node corresponding to the fourth job, and the node corresponding to the ninth job is converted to a node corresponding to the third job which starts when accepting the processing result of the fourth job obtained by the conversion of the eighth job; and a fifth simplification rule in which, if there are the first job (a tenth job) outputting two processing results, the third job (an eleventh job) which starts when accepting one of the processing results of the tenth job and outputs two processing results, the fourth job (a twelfth job) which starts when accepting only the other one of the processing results of the tenth job and one of the processing results of the eleventh job, and the first job (a thirteenth job) which starts when accepting only the other one of the processing results of the eleventh job, and the first job (a thirteenth job) which starts when accepting only the other one of the processing results of the eleventh job and the processing result of the twelfth job, then in the network, the node corresponding to the thirteenth job is converted to a node corresponding to the first job which starts when accepting any of the processing results of the tenth job and the processing result of the eleventh job.

Preferably, the predetermined connection patterns include a first connecting pattern which shows that a loop is happening in the processing between the above nodes in the network.

Preferably, the processing flow may include a conditional branch as the job, and on the network, the predetermined connection patterns include:

a second connection pattern which shows that there is a job which starts when accepting the processing result of a plurality of jobs to be executed in parallel after a branch is made on any condition of the conditional branch, and the processing result of one or more jobs to be executed after a branch is made on the other condition of the conditional branch; and a third connection pattern which shows that there is a job which starts when accepting the processing result of a job executed by any of a plurality of conditional branches to the executed in parallel, and the processing result of a job executed by any other of the plurality of branch conditions.

The possibility of execution evaluating apparatus related to the present invention evaluates whether or not a processing flow defined in the form of a PERT diagram or a similar form such as a table representing the contents of a PERT diagram and including conditional branches and a plurality of jobs executable in parallel can be described by a conventional procedure-oriented programming language or a flowchart (possibility of execution).

Except for the first job, each of the jobs included in the processing flow accepts all the data necessary for the processing as the processing result of one or more jobs performing the processing of the previous stage, and starts only after it has the complete data necessary for the processing.

If the processing flow cannot be executed, the possibility of execution evaluating apparatus related to the present invention presents the fact an reason to the user, thereby to aid the creation of a program for implementing the above processing flow.

A table form and a PERT diagram can more easily define a large-sized and complex processing flow including many jobs executed in parallel than a procedure-oriented programming language or a flowchart.

If a processing flow including a plurality of jobs executable in parallel and defined, for instance, by a table form is expressed by a network in the form of a PERT diagram with the respective jobs being as its nodes, the simplification means sequentially applies to the network, for instance, a rule (any of the simplification rules 1–5) for transforming it to a topologically identical and simpler network, thereby to perform a simplification.

Each time the simplification means simplifies the network, the possibility of execution evaluating means checks the occurrence of any connection pattern such as a loop in the network, which makes the processing flow inexecutable.

If a connection pattern making the processing flow inexecutable has occurred, the possibility of execution evaluating means determines that the processing flow is inexecutable, and displays to the user to the effect that the processing flow is inexecutable, as well as the portion of the processing flow where a problem has occurred and what kind of problem has occurred.

Conversely, at the end of the simplification for the whole network, if no connection pattern making the processing flow inexecutable has occurred in any part of the network, the possibility of execution evaluating means determines that the processing flow is executable.

For the jobs included in the part for which the simplification has been completed in the network, other jobs giving the processing results causing them to start are determined.

The starting job determining means determining, in the network, the processing result causing the start of each of the jobs included in the part for which the simplification has been completed (except for the job executed first in the processing flow), and makes the starting condition of each job clear to assist the programming by a procedure-oriented language.

Further, the possibility of execution evaluating method related to the present invention is a possibility of execution evaluating method for evaluating the possibility of execution of a processing flow including one or more jobs which can be executed in parallel, each of the jobs starting when accepting the processing result of one or more previous jobs, comprising: simplifying a PERT network including one or more previous jobs, comprising: simplifying a PERT network including one or more jobs included in the processing flow as its nodes, respectively, according to predetermined rules (simplification rules); and evaluating the processing flow as being inexecutable when predetermined condition patterns are happening between the nodes in the part being not able to be simplified any more in the simplified network.

Further, the recording medium related to the present invention is such that, in a possibility of execution evaluating apparatus for evaluating the possibility of execution of a processing flow including one or more jobs which can be executed in parallel, each of the jobs starting when accepting the processing result of one or more previous jobs, a recording medium having recorded thereon a program for executing the steps of: sequentially simplifying a PERT network including one or more jobs included in the processing flow as its nodes, respectively, according to predetermined rules (simplification rules); and evaluating the processing flow as being inexecutable when predetermined connection patterns are happening between the nodes in the part being not able to be simplified any more in the network.

BRIEF DESCRIPTION OF THE DRAWINGS

Preferred embodiments of the present invention will now be described by way of example only, with reference to the accompanying drawings in which:

FIG. 1 is a diagram exemplifying a processing flow defined using a PERT diagram;

FIG. 2 is a diagram exemplifying parallel execution and queuing in a processing flow defined by a PERT diagram;

FIG. 3 is a diagram exemplifying a processing flow defined by a PERT diagram and including a combination of conditional branch, parallel execution, and queuing;

FIG. 4 is a diagram exemplifying a processing flow defined by a PERT diagram and including a combination of conditional branch, parallel execution, and queuing;

FIG. 5 is a diagram showing the construction of a computer for implementing the possibility of execution evaluating method related to the present invention;

FIG. 6 is a diagram showing the construction of a compiler for implementing the possibility of execution evaluating method related to the present invention;

FIG. 7 is a diagram exemplifying a GUI (Graphical User Interface) image for command line inputting which is displayed on a display unit (FIG. 5) by a command line creating unit (FIG. 6), and the command lines inputted to the respective lines (ID0–ID9) of the GUI image;

FIG. 8 is a diagram showing the processing flow including the jobs ID0–ID9 corresponding to the respective lines of the table shown in FIG. 7 in the form of a PERT diagram;

FIG. 9 is a diagram showing the initial value of the number of references (magic number) to each of the jobs ID1–ID9 included in the processing flow defined by a PERT diagram;

FIGS. 10(A)–(E) are diagrams showing the simplification rules 1–5 that the simplification unit shown in FIG. 6 uses to simplify the processing flow defined by a PERT diagram;

FIG. 11 is a first diagram showing the simplification process by the simplification unit (FIG. 6) by taking the processing flow shown in FIGS. 8 and 9 as a specific example;

FIG. 12 is a second diagram showing the simplification process by the simplification unit (FIG. 6) by taking the processing flow shown in FIGS. 8 and 9 as a specific example;

FIG. 13 is a third diagram showing the simplification process by the simplification unit (FIG. 6) by taking the processing flow shown in FIGS. 8 and 9 a specific example;

FIG. 14 is a fourth diagram showing the simplification process by the simplification unit (FIG. 6) by taking the processing flow shown in FIGS. 8 and 9 a specific example;

FIGS. 15(A)–(D) are diagrams exemplifying a connection pattern which is determined to be inexecutable in a network representing a processing flow, respectively;

FIG. 16 is a diagram exemplifying the virtual job executing apparatus corresponding to each of the jobs ID0–ID9 exemplified in FIG. 8; and FIG. 17 is a flowchart showing the processing (S10) by the complier shown in FIG. 6.

DETAILED DESCRIPTION OF THE PREFERRED EMBODIMENTS OF THE INVENTION

FIG. 1 is a diagram for exemplifying a processing flow defined by using a PERT diagram.

First, to understand the present invention more easily, description is made to how a processing flow including a plurality of jobs executable in parallel is defined using a PERT diagram.

The PERT diagram has been used as a project management tool, as described above, but, as exemplified in FIG. 1, if a processing flow is expressed in the form of a network having each job as a node, it can also be applied to the definition of a processing such as a routine task performed by a system.

Further, if the way of synchronization between distributed computers is defined, the PERT diagram can also be applied to the defining of a large-scaled processing performed in cooperation with distributed computers. That is, the PERT diagram is also suitable, for instance, for the defining of a processing in which the backup task of a distributed computer system including a plurality a servers is performed in combination with a software distribution task or the like.

The definition of a processing flow using a PERT diagram is described below by taking an example.

FIG. 2 is a diagram for exemplifying the parallel execution and queuing in a processing flow defined by a PERT diagram.

If a processing flow is defined as exemplified in FIG. 2, jobs 1–4 are executed in parallel, and the respective jobs shown by dotted lines are carried out asynchronously.

A plurality of jobs executed in parallel and asynchronously in this way is called parallel execution jobs.

There is no such parallel execution job concept in the conventional flowchart and procedure-oriented programming languages.

To describe a plurality of jobs to be executed in parallel, it is needed to explicitly describe that those jobs are jobs that can be independently executed in parallel in a processing system enabling a multitasking.

Such explicit description in a procedure-oriented language requires instructions on the allocation to different threads, and it is not easy for the user to concisely describe the instructions using a procedure-oriented language.

Further, in the processing flow exemplified in FIG. 2, the job 100 is not started and executed before all the jobs up to the previous stage are completed and the job 100 can receive the processing results of all the jobs up to the previous stage.

Such condition in a processing flow is called queuing.

To express a queuing with a procedure-oriented language or a script language, a conditional statement such as an IF statement is commonly used. However, the PERT diagram is a project management tool, and if a certain job is put into focus, it is an included understanding that the processing of the job is executed only after all the jobs up to the previous stage before the job are terminated.

The PERT diagram, differently from procedure-oriented languages and the alike, is suitable for describing such parallel execution and queuing.

FIG. 3 is a diagram for exemplifying a processing flow defined by a PERT diagram and including a combination of a conditional branch, parallel execution, and queuing.

In a PERT diagram, the conditional branch has not been allowed up to the present. The reason for it is that project management including variables should originally not be allowed for the PERT diagram.

However, since variables due to execution errors and system malfunctions must always be considered to define the processing flow of a computer system, the conditional branch exemplified in FIG. 3 is a necessary concept. Further, by allowing the conditional branch, a very wide processing flow can be defined.

In addition, the processing streams made to branch away by the conditional branch are always defined to join together.

Moreover, since the end point in the PERT diagram means the completion of the project, it is not allowed to define the processing flow so as to interrupt the flow of the processing at a point other than the end point after the conditional branch.

FIG. 4 is a diagram for exemplifying a complex processing flow defined by a PERT diagram and including, in combination, conditional branches, parallel executions, parallel executions, and queuing Further, as exemplified in FIG. 3, it is needless to say that, in a PERT diagram, it is possible to combine conditional branches, parallel executions, and queuing.

A PERT diagram can also define the processing flow exemplified in FIG. 3 very simply as compared with procedure-oriented languages.

Further, if the processing flow is more difficult as shown in FIG. 4, the description by a procedure-oriented language becomes more difficult.

However, it is not so difficult for the designer to follow the processing flow with FIG. 4, and thus it is understood that there is a merit in defining a processing flow using a PERT diagram.

The present invention provides an environment suitable for a computer to implement, as an executable program, a processing flow defined using a PERT diagram having many merits as described above.

FIG. 5 is a diagram showing the construction of a computer 1 which realizes that the possibility of execution evaluating method related to the present invention.

As shown in FIG. 5, the computer 1 comprises a CPU 10 including a general-purpose microprocessor, a memory, and peripheral circuits for them (all of them are not shown), a display unit 12 such as a CRT or LCD, an input device 14 including a keyboard 140 and a mouse 142, and a storage device 16 such as HDD, FDD, or MOD. That is, the computer 1 employs the construction of a common computer.

The computer 1 uses these components to execute software such as an operating system (OS) and a compiler 2 (to be described later with reference to FIG. 6).

FIG. 6 is a diagram showing the construction of the compiler 2 for implementing the possibility of execution evaluating method relating to the present invention.

As shown in FIG. 6, the compiler 2 comprises a command line creating unit 202, an error checking unit 204, a reference detecting unit 206, a simplification unit 208, and a program creating unit 210.

The compiler 2 uses these components to evaluate the possibility of execution of a processing flow which can be defined by a PERT diagram, and if the processing flow is executable, it uses a procedure-oriented programming language (such as C) to create a program for executing the processing flow on the computer, and if the processing flow is inexecutable, it displays to the user to that effect, as well as the cause of the execution being impossible.

FIG. 7 is a table for exemplifying the GUI (Graphical User Interface) image for command line input which the command line creating unit 202 displays on the display unit 12 (FIG. 5), and the command lines inputted to each line (ID0–ID9) of the GUI image.

FIG. 8 is a diagram showing a processing flow including the jobs ID0 to ID9 corresponding to the respective lines of the table shown in FIG. 7 in the form of a PERT diagram.

Hereinafter, description is made to the processing flow shown in FIGS. 7 and 8 unless otherwise specified.

The command line creating unit 202 displays on the display unit 12 a GUI image representing the table for command line input that is exemplified in FIG. 7.

For the GUI image displayed on the display unit 12, the user uses the input device 14 to input the necessary matter to each line (ID0–ID9: one line corresponds to one job) of the table exemplified in FIG. 7, the command line creating unit 202 stores the inputted command line in the storage device 16 or the like.

If a PERT diagram is used to define a processing flow including the jobs corresponding to the respective command lines of the table form exemplified in FIG. 7 as its nodes, a network exemplified in FIG. 8 can be obtained.

The error checking unit 204 reads out the command lines accepted by the command line (FIG. 7) creating unit 202 one by one, and checks each line for an error, for instance, whether a character has been mistakenly inputted to an item for which a numeric should be inputted.

If there is an error in a command line, the command line creating unit 202 displays an error message on the display unit 12 and requests the user to correct it.

The reference detecting unit 206 performs a search for references to each line of the table exemplified in FIG. 7 that are made by any other lines, thereby to obtain the initial value of the number of references made to each line.

That is, the reference detecting unit 206 performs a search for references to each job corresponding to each line of the table by any other jobs, thereby to obtain the number of references made to each job.

FIG. 9 is a diagram showing the initial value of the number of references (magic number) to each of the jobs ID1 to ID9 included in the processing flow shown in FIG. 8.

How to obtain the number of references is described with further reference to FIG. 9.

The reference detecting unit 206 performs a search for the processing results from any other jobs that cause each of the jobs (FIG. 8) corresponding to the respective lines (ID0–ID9) of the table shown in FIG. 7 to start, and makes the number of the processing results received by each job the initial value of the number of references (magic number) to each job.

That is, as shown in FIG. 9, of the jobs ID0–ID9 corresponding to the respective lines ID0–ID9, the number of references (magic number) is not defined for the job ID0.

Further, the job ID1 is referenced only by the job ID0, the jobs ID2, ID3 and ID5 are referenced only by the job ID1, respectively, the job ID6 is referenced only by the job ID5, and the job ID7 is referenced only by the job ID6. Since the connection pattern of these jobs is not simplified any more, the reference detecting unit 206 determines the number of references (magic number) for the jobs ID1–ID3 and ID5–ID7 as 1.

Furthermore, the job ID4 is referenced by the jobs ID2 and ID3, the job ID8 is referenced by the jobs ID6 and ID7, and the job ID9 is referenced by the jobs ID4 and ID8, so the reference detecting unit 206 determines the initial value of the number of references for the jobs ID4, ID8 and ID9 as 2.

However, as shown by "?" in FIG. 9, if a job is referenced from the path from a conditional branch, the condition for actually enabling the job to start is less than the number of references to the job.

Further, if the preceding job of the particular job is a conditional branch, and it is referenced from both the true and false paths thereof, then the number of references (magic number) should be definite, but, of the paths become complicated, the number of references may actually not be made definite only from the relationships between the jobs before and after the particular job.

For instance, in FIG. 9, the initial value of the number of references (magic number) for both jobs ID4 and ID8 is 2, but, whether the paths referencing these jobs are from the parallel execution of the two jobs or from both true and false of a conditional branch cannot be determined only from the preceding job.

Accordingly, at a point of time when the reference detecting unit 206 obtains the initial value of the number of references (magic number), the number of references (magic number) to the jobs ID4, ID8 and ID9 cannot be the final value.

Then, the simplification unit 208 (FIG. 6) apples the following simplification rules 1–5, which are generally applicable to a network, to the network of the processing flow shown in FIG. 9 to sequentially simplify the network, and when the network cannot be simplified any more (specifically, when the following simplification rule 4 (FIG. 10(C)) is applied), it subtracts one from the number of references (magic number) to each of the jobs ID4, ID8 and ID9.

FIGS. 10(A)–(E) are diagrams showing the simplification rules 1–5 which the simplification unit 208 shown in FIG. 6 uses for the simplification of the processing flow defined by a PERT diagram, respectively.

Now, the simplification rules 1–5 are described with reference to FIG. 10.

As shown in FIG. 10(A), in accordance with the simplification rule 1, if there are a job A which starts when accepting the processing result of one or more next jobs, a job B which starts when accepting only the processing result of the job A and outputs only one processing result, and a job C which starts when accepting only the processing result of the job B and outputs a processing result to one or more next jobs, the node corresponding to the job B is removed from the network, and the node corresponding to the job A and the node corresponding to the job C are directly connected.

The simplification rule 1 has a meaning of simplifying a network topologically equally.

As shown in FIG. 10(B), in accordance with the simplification rule 2, if there are a job A which starts when accepting the processing result of one or more jobs and outputs a processing result only to one next job, and a job B (corresponding to the job ID9 in FIGS. 8 and 9) which starts when accepting only the processing result of the job A and outputs a processing result of the job A and outputs a processing result to the next job, the node corresponding to the job B is removed in the network.

The simplification rule 2 has a meaning of simplifying a network while maintaining topological equality.

As shown in FIG. 10(C), in accordance with the simplification rule 3, if there are a job A (same as the job A of the simplification rule 1) which starts when accepting the processing result of one ore more previous jobs and outputs processing results to a plurality of next jobs, and a job C (same as the job A of the simplification rule 1) which starts when accepting all of the plurality of processing results of the job A and outputs a processing result to one or more next jobs, the plurality of processing results outputted from the node corresponding to the job A to the node corresponding to the job C is collected to one.

The simplification rule 3 has a meaning of determining the plurality of references to a job is a queuing of parallel executions, and transforming it to a network that can be further simplified.

As shown in FIG. 10(D), in accordance with the simplification rule 4, if there are a job A showing a conditional branch and a job C (same as the job C in the simplification rule 1) which starts when accepting all the processing results of the branching by the job A and outputs a processing result to one more jobs, then, in the network, the job A (same as the job A in the simplification rule 2), which starts when accepting a processing result from one or more previous jobs and outputs a processing result to one next job.

Further, the node corresponding to the job C is converted to a node corresponding to the job C, which starts when accepting only the processing result of the converted job A and outputs a processing result to one or more next jobs.

The simplification rule 4 has a meaning of determining a plurality of references to a job to be a joining of conditional branches, and performing a conversion to a network that can be further simplified.

As shown in FIG. 10(E), in accordance with the simplification rule 5, if there are a job A (same as the job A in the simplification rule 1) which starts when accepting the processing result of one or more previous jobs and outputs two processing results, a job B (same as the job C in the simplification rule 2) which starts when accepting the other one of the processing results of the job A and only one of the processing results of the job B, and a job D which starts when accepting the other one of the processing result of the job C and outputs a processing result to one or more next jobs, then, in the network, the node corresponding to the job D is converted to a job D, which starts when accepting the processing result of the job C and outputs a processing result to one or more next jobs, and the job C is converted to a job C, which starts when accepting the two processing results of the job A and outputs one processing result only to the job D.

In addition, the simplification rule 5 is essential in the processing of the simplification unit 208 (FIG. 6), but it is an exceptional rule, and used to deal with a special connection pattern shown in FIG. 10(E) in the process of a simplification using the simplification rules 1–4. Since the connection pattern shown in FIG. 10(E) cannot be topologically simplified any more, the use of the simplification rule 5 accelerates the simplification.

FIGS. 11 to 14 are diagrams showing the simplification process by the simplification unit 208 (FIG. 6) by taking the processing flow shown in FIGS. 8 and 9 as a specific example.

Further referring to FIGS. 11 to 14, the simplification process by the simplification unit 208 is specifically described below for the case exemplified in FIGS. 8 and 9.

First, by applying the simplification rule 1 to the jobs ID1–ID4 in the network shown in FIG. 9, and applying the simplification rule 1 to the jobs ID1–ID6, a network shown in FIG. 11 can be obtained.

At this stage, since the jobs ID1–ID4 cannot be simplified any more except by using the simplification rule 3, the number of references (magic number) to the job ID4 is determined to be 2.

By applying the simplification rule 3 to the jobs ID1–ID4 in the network shown in FIG. 11, and applying the simplification rule 4 to the jobs ID6–ID8, the network shown in FIG. 12 can be obtained, and the number of references (magic number) to ID8 is determined to be 1.

By applying the simplification rule 1 to the network shown in FIG. 12, the network shown in FIG. 13 can be obtained, and the number of references (magic number) to ID9 is determined to be 2. I the simplification rule 3 is further applied to this network, the network of FIG. 14 is obtained, and the simplification is completed.

FIGS. 15(A)–(D) are diagrams for exemplifying connection patterns which are determined to be inexecutable in a network showing a processing flow, respectively.

Further, in the simplification process that has been described above, if connection patterns (loops 1 and 2, and queuings before joining 1 and 2) which make the implementation of the processing flow shown in FIGS. 11(A)–(D) impossible have occurred in the part which cannot be simplified any more in the network, the simplification unit 208 determines that the processing flow is inexecutable, and displays on the display unit 12 (FIG. 5) to the effect that the processing flow cannot be realized, as well as the part of the network determined to be inexecutable and the reason for it as an error message.

Since the occurrence of the loops 1 and 2 shown in FIGS. 15(A) and (B) may prevent the processing from further advancing from the loops, it is naturally determined to be inexecutable if a loop occurs in the connection pattern between nodes.

Further, execution is determined to be impossible if the queuing before joining shown in FIGS. 15(C) and (D) occurs, because the number of references to the encircled jobs is made indefinite by the result of a conditional branch, and the number of references (magic number) of the next job cannot be uniquely determined, so the job cannot be successfully executed.

In addition, the connection patters determined to be inexecutable in a network are not limited to FIGS. 15(A)–(D), but the user may independently define them.

FIG. 16 is a diagram for exemplifying a virtual job executing apparatus 3 corresponding to each of the jobs ID0–ID9 shown in FIG. 8.

In the program creating unit 210, each of the jobs included in the processing flows that are not determined to be inexecutable in the simplification unit 208 is replaced by the virtual job executing apparatus 3 shown in FIG. 16, using the number of references (magic number) obtained by the simplification unit 208.

The program creating unit 210 further creates a program for implementing the virtual job executing apparatus 3 corresponding to each job by a procedure-oriented programming language, and stores it in the storage device 16 or the like.

When all the processing results necessary for the job corresponding to the virtual job executing apparatus 3 to perform the processing are inputted from the previous jobs, the virtual job executing apparatus 3 executes the processing defined as the virtual job executing apparatus 3, and outputs a processing result to the virtual job executing apparatus 3 corresponding to the next job.

As shown in FIG. 16, if the job corresponding to the virtual job executing apparatus 3 starts only after the plurality of previous jobs is executed in parallel and all the processing results of these jobs are accepted, the processing results (IN) inputted to the virtual job executing apparatus 3 become plural, and the virtual job executing apparatus 3 does not start the processing until the number of the inputted processing results of the previous jobs reaches the number of references (magic number) determined by the processing by the simplification unit 208.

Further, as shown in FIG. 16, for conditional branching, the virtual job executing apparatus 3 can determine to which job it outputs the processing result, depending on the case in which the processing result received from the previous job fulfills the condition, and the case in which the processing result does not fulfill the condition (OUT TRUE/OUT FALSE).

By constructing the virtual job executing apparatus 3 in this way, the control of queuing or the like in a processing flow can be actualized.

FIG. 17 is a flowchart showing the processing (S10) of the compiler 2 shown in FIG. 6.

Further referring to FIG. 17, the operation of the compiler 2 (FIG. 6) is described below.

As shown in FIG. 17, in step 100 (S100), the command line creating unit 202 (FIG. 6) displays on the display unit 12 a GUI image (refer to FIG. 7) showing a table for command line inputting, and when the user inputs necessary matters to the GUI image, the command line creating unit 202 stores the inputted command lines in the storage device 6 or the like.

In step 102 (S102), the error checking unit 204 reads out the command lines (refer to FIG. 7) accepted by the command line creating unit 202 one by one, and checks as to whether or not an error has occurred in each line.

In step S104 (S104), the references detecting unit 206 performs a search for the references made to each line (refer to FIG. 7) from any other lines, thereby to obtain the initial value of the number of references (magic number) to each line (refer to FIGS. 8 and 9).

In step S106 (S106), the simplification unit 208 (FIG. 6) apples the simplification rules 1–5 to the network (refer to FIGS. 8 and 9) and sequentially simplifies it, thereby to determine the number of references (magic number) for all the jobs (refer to FIGS. 10 to 14).

In steps S108 (S108), the simplification unit 208 determines that the implementation of the processing flow is impossible if a connection pattern (FIGS. 15(A)–(D)) making the implementation of the processing flow impossible occurs in the part that cannot be simplified any more in the network, and displays an error message on the display unit 12 (FIG. 5) to terminate the processing (S112). Otherwise the simplification unit 208 advances to the processing in S110.

In step S110 (S110), the program creating unit 210 uses the number of references (magic number) to each job determined in the processing in S106 to replace each of the jobs included in the processing flow that is not determined to be inexecutable in the processing in S108 by the virtual job executing apparatus 3 (FIG. 16), creates a program for implementing the virtual job executing apparatus 3 corresponding to each job, and stores it in the storage device 16 or the like.

As described above, in accordance, with the possibility of execution evaluating apparatus and method related to the present invention, the possibility of execution of a processing defined by a PERT diagram or a similar method can be evaluated, and the creation of a program for implementing the defined processing can be assisted.

Further, in accordance with the possibility of execution evaluating apparatus and method related to the present invention, evaluation is made to whether or not a processing defined by a PERT diagram or a similar form can be described by a procedure-oriented programming language, and if it cannot be described, the reason for it can be pointed out to assist the creation of a program for implementing the above processing.

While the invention has been particularly shown and described with respect to preferred embodiments thereof, it will be understood by those skilled in the art that the foregoing and other changes in form and details may be made therein without departing from the spirit and scope of the invention.

What is claimed is:

1. Apparatus for determining whether a processing flow, including a plurality of jobs executable in parallel, can be executed each of said jobs starting when the job accepts the processing result of one or more previous jobs, the apparatus comprising:

a simplification unit for simplifying a Program Evaluation and Review Technique (PERT) network according to predetermined rules, said network including one or more nodes formed by one or more jobs in said processing flow, and wherein said network, after being simplified, includes a part in which connections between the nodes of said part cannot be further simplified according to said rules; and an evaluating unit for identifying said processing flow, prior to execution, as being unexecutable when predetermined connection patterns are present, between a plurality of the nodes in said part of the network.

2. Apparatus as set forth in claim 1, further comprising a starting job determining unit for sequentially determining which of the previous jobs provides a processing result that causes the jobs, which correspond to the nodes in said part of the network, to start when accepting the processing result in the simplified network.

3. The apparatus as set forth in claim 1, wherein said simplification rules include rules for transforming said PERT network to a topologically equal simple form.

4. Apparatus as set forth in claim 1, wherein said processing flow may include conditional branches as said jobs, and said simplification rules include:

a first rule in which there are one or more staring jobs, and if there are a first job which outputs processing results to one or more next jobs, a second job which starts when accepting only the processing result of said first job and outputs a processing result to one or more next jobs, then in said PERT network, the node corresponding to said second job is removed, and the node corresponding to said first job and the node corresponding to said third job are directly connected to each other;

a second simplification rule in which there are one or more starting jobs, and if there are a fourth job which outputs a processing result only to one next job, and a fifth job which starts when accepting only the processing result of said forth job and does not output a processing result to the next job, then in said network, the node corresponding to said fifth job is removed;

a third simplification rule in which, if there are a sixth job, and a seventh job which starts when accepting a plurality of processing results of said sixth job, the plurality of processing results which are outputted from said sixth job to said seventh job are collected to one of the jobs in said network;

a fourth simplification rule in which, if there is a eighth job showing a conditional branch, and a ninth job which starts when accepting the results of the conditional branch of said eighth job, then in said network, the node corresponding to said eighth job is converted to a node corresponding to forth job, and the node corresponding to the said ninth job is converted to a node corresponding to said third job which starts when accepting the processing result of said fourth job obtained by the conversion of said eighth job; and a fifth simplification rule in which, if there are a tenth job outputting two processing results, an eleventh job which starts when accepting one of the processing results of said tenth job and outputs two processing results, a twelfth job which starts when accepting only the other one of the processing results of said tenth job and one of the processing results of said eleventh job, and a thirteenth job which starts when accepting only the other one of the processing results of said eleventh job and the processing result of said twelfth job, then in said network, the node corresponding to said eleventh job is removed, and the node corresponding to said thirteenth job is converted to a node corresponding to said first job which starts when accepting any of the processing result of said eleventh job.

5. Apparatus as set forth in claim 1, wherein said predetermined connection patterns include a first connection pattern which shows a loop in the processing between said nodes in said network.

6. Apparatus as set forth in claim 5, wherein said processing flow includes a conditional branch as one of said jobs, and in said network, said predetermined connection patterns include;

a second connection pattern which shows that one of said jobs starts when accepting the processing result of a plurality of jobs to be executed in parallel after a branch is made on any condition of the conditional branch, and the processing result of one or more jobs to be executed after a branch is made on the other condition of the conditional branch; and a third connection pattern which shows that one of said jobs starts when accepting the processing result of a job executed by any of a plurality of conditional branches to be executed in parallel, and the processing result of a job executed by any other of said plurality of branch conditions.

7. Apparatus according to claim 1, wherein, when said predetermined connection patterns are present, the evaluating unit displays to a user a reason why the processing flow cannot be executed.

8. Apparatus according to claim 1, wherein, when said predetermined connection patterns are present, the evaluating unit identifies to a user the part of the network having said connection patterns.

9. A method for determining whether a processing flow, including a plurality of jobs executable in parallel, can be executed, each of said jobs starting when the job accepts the processing result of one or more previous jobs, the method comprising:

simplifying a Program Evaluation and Review Technique (PERT) network according to predetermined rules, said network including one or more nodes formed by one or more jobs in said processing flow, and wherein said network, after being simplified, includes a part in which connections between the nodes of said part cannot be further simplified according to said rules; and evaluating said processing flow, prior to execution, as being unexecutable when predetermined condition patterns are present, between the nodes in said part of the network.

10. A recording medium readable by machine, tangibly embodying a program of instructions executable by the machine to perform method steps for determining whether a processing flows, including a plurality of jobs executable in parallel, can be executed, each of said jobs starting when the job accepts the processing result of one or more previous jobs, said method steps comprising sequentially simplifying a Program Evaluation and Review Technique (PERT) network according to predetermined rules, said network including one or more nodes formed by one or more jobs in said processing flow, and wherein said network, after being simplified, includes a part in which connections between the nodes of said part cannot be further simplified according to said rules; and evaluating said processing flow, prior to execution, as being unexecutable when predetermined connection patterns are present between a plurality of the nodes in said part of the network.

* * * * *